(12) United States Patent
Åberg

(10) Patent No.: US 6,785,243 B2
(45) Date of Patent: Aug. 31, 2004

(54) ERROR REPORTING IN A MOBILE TELECOMMUNICATIONS NETWORK

(75) Inventor: Fredrik Åberg, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 837 days.

(21) Appl. No.: 09/728,529

(22) Filed: Dec. 1, 2000

(65) Prior Publication Data

US 2002/0128005 A1 Sep. 12, 2002

(30) Foreign Application Priority Data

Dec. 2, 1999 (GB) ............................................. 9928546

(51) Int. Cl.$^7$ ............................................. G01R 31/08
(52) U.S. Cl. ........................ 370/252; 370/248; 370/242; 455/424
(58) Field of Search ................................. 310/242, 248, 310/249, 252; 455/423, 424

(56) References Cited

U.S. PATENT DOCUMENTS

| | | | | |
|---|---|---|---|---|
| 5,295,154 A | * | 3/1994 | Meier et al. | ................. 370/351 |
| 5,325,524 A | * | 6/1994 | Black et al. | .................. 707/10 |
| 6,119,170 A | * | 9/2000 | Schoffelman et al. | ........ 709/244 |
| 6,374,303 B1 | * | 4/2002 | Armitage et al. | ............ 709/242 |
| 2001/0034228 A1 | * | 10/2001 | Lehtovirta et al. | ........... 455/424 |

OTHER PUBLICATIONS

ETSI 3G TS 25.415 V3.0.0 (Oct. 1999), 'Online! Dec. 13–15, 1999, XP002161380 Nice FR Retrieved from the Internet: <URL:www.3gpp.org/ftp/TSG_RAN/TSGR_06/Docs?Pdfs?RP–99749.pdf> 'retrieved on Feb. 26, 2001! Cited in the application p. 7 –p. 10.

"3rd Generation Partnership Project; Technical Specification Group Radio Access Network; Utran UI Interface User Plane Protocols. (Release 1999)" 3G TS 25.415 V3.2.0 (Mar. 2000), XX, XX, 1999, XP002149974.

* cited by examiner

Primary Examiner—Steven Nguyen
Assistant Examiner—Thien Tran

(57) ABSTRACT

A method of reporting errors in a mobile telecommunications network comprising a core network and a UMTS Terrestrial Radio Access Network (UTRAN). The method comprises the steps of generating an error message at an error originating entity in either the core network or the UTRAN, sending the error message to an error destination entity in the other of the core network and the UTRAN over an Iu interface, and incrementing a distance counter contained in or accompanying the error message at each intermediate entity through which the error message passes. The error destination entity is able to identify the error originating entity on the basis of the value of the distance counter contained in or accompanying the received error message.

12 Claims, 3 Drawing Sheets

| Bits | | | | | | | | Number of Octets | |
|---|---|---|---|---|---|---|---|---|---|
| 7 | 6 | 5 | 4 | 3 | 2 | 1 | 0 | | |
| PDU Type (=14) | | | | Ack/Nack (=0) | | PDU Type 14 Frame Number | | 1 | Frame Control Part |
| Spare | | | | Procedure Indicator (=3) | | | | 1 | |
| Header CRC | | | | | | Payload CRC | | 1 | Frame Checksum Part |
| Payload CRC | | | | | | | | 1 | |
| Error distance | | Spare | | | | | | 2 | Frame Payload Part |
| Cause value | | | | | | | | | |

ERROR REPORTING IN A MOBILE TELECOMMUNICATIONS NETWORK

BACKGROUND

This application claims priority under 35 U.S.C. §§119 and/or 365 to 9928546.2 filed in Great Britain on Dec. 2, 1999; the entire content of which is hereby incorporated by reference.

The present invention relates to error reporting in a mobile telecommunications network. More particularly, the invention relates to error reporting in the Iu User Plane (UP) between a Universal Mobile Telecommunications Network (UMTS) core network and a UMTS Terrestrial Radio Access Network (UTRAN).

BACKGROUND TO THE INVENTION

FIG. 1 illustrates schematically a part of a Universal Mobile Telecommunications System (UMTS) network. The network includes a core network part 1, which may be a network handling voice calls using UMTS Mobile-services Switching Centres (UMSCs) or may be a data network such as a General Packet Radio Service (GPRS) network including Serving GPRS Support Nodes (SGSNs). In FIG. 1 the UMSCs and SGSNs are indicated generally with the reference numeral 2. A subscriber or User Equipment (UE) 3 is coupled to the core network 1 via an access network 4 referred to as a Universal Terrestrial Radio Access Network (UTRAN). More particularly, the UMSCs/SGSNs 2 are connected to Radio Network Controllers (RNCs) 5,6 of the UTRAN 4 over an interface referred to as the Iu interface.

Each RNC 5 forms part of a Radio Network Subsystem (RNSs) 7,8 which also comprises a set of Base Transceiver Stations 9 referred to in UMTS terminology as Node B's. The interface between a RNC 5,6 and a Node B 9 is known as the Iub interface. A Node B 9 provides the connection point for a UE 3 to the UTRAN 4, and the interface between the Node B 9 and the UE 3 is known as the Uu interface. The RNS (RNS 7 in FIG. 1) which connects a UE 3 to the core network 1 at any given time is referred to as the Serving RNS (SRNS) for that particular UE 3.

FIG. 2 illustrates in very general terms the bearer structure used by UTRAN to carry user data between the UE 3 and the core network 1. When it is required to establish a user plane connection, the responsible UMSC or SGSN 2 instructs the UTRAN 4 to establish a logical connection between the UMSC or SGSN 2 and the UE 3. This logical connection is referred to as a Radio Access Bearer (RAB). The established RAB inherits requirements of the requested UMTS service, e.g. Quality of Service, etc. Based on the inherited requirements of the RAB, the RNC 5,6 establishes user plane connections with the core network 1 (i.e. UMSC or SGSN 2) and with the UE 3. The connection between the RNC 5,6 and the core network 1 is referred to as the Iu bearer whilst the connection between the RNC 5,6 and the UE 3 is referred to as the Radio Bearer (RB). Both of these bearers represent further logical channels, with the RNC performing a mapping between them. The bearers themselves are mapped onto appropriate traffic channels for transmission over the respective interfaces (Iu and Uu).

In addition to carrying user data, the Iu bearer carries related control information between the UTRAN and the core network. Work is currently ongoing under the auspices of the European Telecommunications Standards Institute (ETSI) to specify the Iu User Plane (UP) protocol for carrying this control information. The specification is referred to as 25.415 and the current version is version 3.0.0 (1999-10). The current version of the Iu UP protocol does not deal with error handling, i.e. it does not provide for an "abnormal event" procedure. It is acknowledged that such a procedure is necessary to deal with errors such as might occur, for example, during a call initialisation stage.

SUMMARY

It is to be expected that ETSI will define as part of the 25.415 recommendation a set of error types, together with an Iu UP Packet Data Unit (PDU) format for conveying error messages between Iu entities (in the UTRAN and in the core network). It will be appreciated that an error message may pass through one or more intermediate entities on its journey between the originating entity and the terminating entity. A potential problem with such a solution however is that an entity receiving an error message may not know the source of an error message, even though it might know the error type and the identity of the last entity in the transmission path.

According to a first aspect of the present invention there is provided a method of reporting errors in a mobile telecommunications network comprising a core network and a UMTS Terrestrial Radio Access Network (UTRAN), the method comprising:

generating an error message at an error originating entity in one of the core network and the UTRAN;

sending the error message to an error destination entity in the other of the core network and the UTRAN over an Iu interface; and at each intermediate entity through which the error message passes, incrementing a distance counter contained in or accompanying the error message, wherein the error destination entity is able to identify the error originating entity on the basis of the value of the distance counter contained in or accompanying the received error message.

In certain embodiments of the present invention, error messages are sent between a UMTS Mobile Switching Centre (UMSC) of the core network and a Radio Network Controller (RNC) of the UTRAN. In other embodiments of the present invention, the error message may be sent between two RNCs, via the core network. The error message may be generated at either an Iu User Plane protocol instance or at an upper layer entity of the UMSC/RNC. Similarly, the message may be sent over the Iu interface to either an Iu User Plane protocol instance or upper layer entity of the receiving UMSC/RNC. Where the error message is generated by an upper layer entity, the message may be sent to a peer entity, over the Iu interface, via respective Iu User Plane protocol instances at the sending and receiving nodes (where the term "node" identifies either a UMSC or an RNC). Where the error message is generated by an Iu User Plane protocol instance, the error message may be sent to an upper layer entity of the same node, as well as over the Iu interface.

Preferably, the error message is incorporated into an abnormal event frame for sending over the Iu interface. The frame is constructed at the Iu interface of the node where the error message is generated. More preferably, the frame contains an error type identifier ("cause value") and said distance counter.

According to a second aspect of the present invention there is provided a mobile telecommunications network comprising a core network and a UMTS Terrestrial Radio Access Network (UTRAN) each comprising a number of nodes communicating over an Iu interface with nodes of the other network, wherein each node comprises:

means for generating error messages at an error originating entity;

means for sending error messages to an error destination entity in another node, and means for receiving error messages from an error generating entity in another entity, over an Iu interface; and at least one intermediate entity through which error messages pass and which are arranged to increment a distance counter contained in or accompanying each error message, wherein an error destination entity is able to identify the error originating entity on the basis of the value of the distance counter contained in or accompanying the received error message.

According to a second aspect of the present invention there is provided a method of reporting errors in a mobile telecommunications network comprising a core network and a UMTS Terrestrial Radio Access Network (UTRAN), the method comprising:

generating an error message at an error originating entity in one of the core network and the UTRAN;

constructing an abnormal event frame incorporating said error message and a code which identifies the location of said error originating entity; and sending the error message to an error destination entity in the other of the core network and the UTRAN over an Iu interface, wherein the error destination entity is able to identify the location of the error originating entity on the basis of said code contained in said abnormal event frame.

The method comprises constructing a second or modified abnormal event frame incorporating said error message and a code which identifies the location of said error originating entity, the first mentioned code identifying the originating entity as belonging to a different node than the destination entity, and the second mentioned code identifying the originating entity as belonging to the same node as the destination entity.

DETAILED DESCRIPTION

Figure 1:
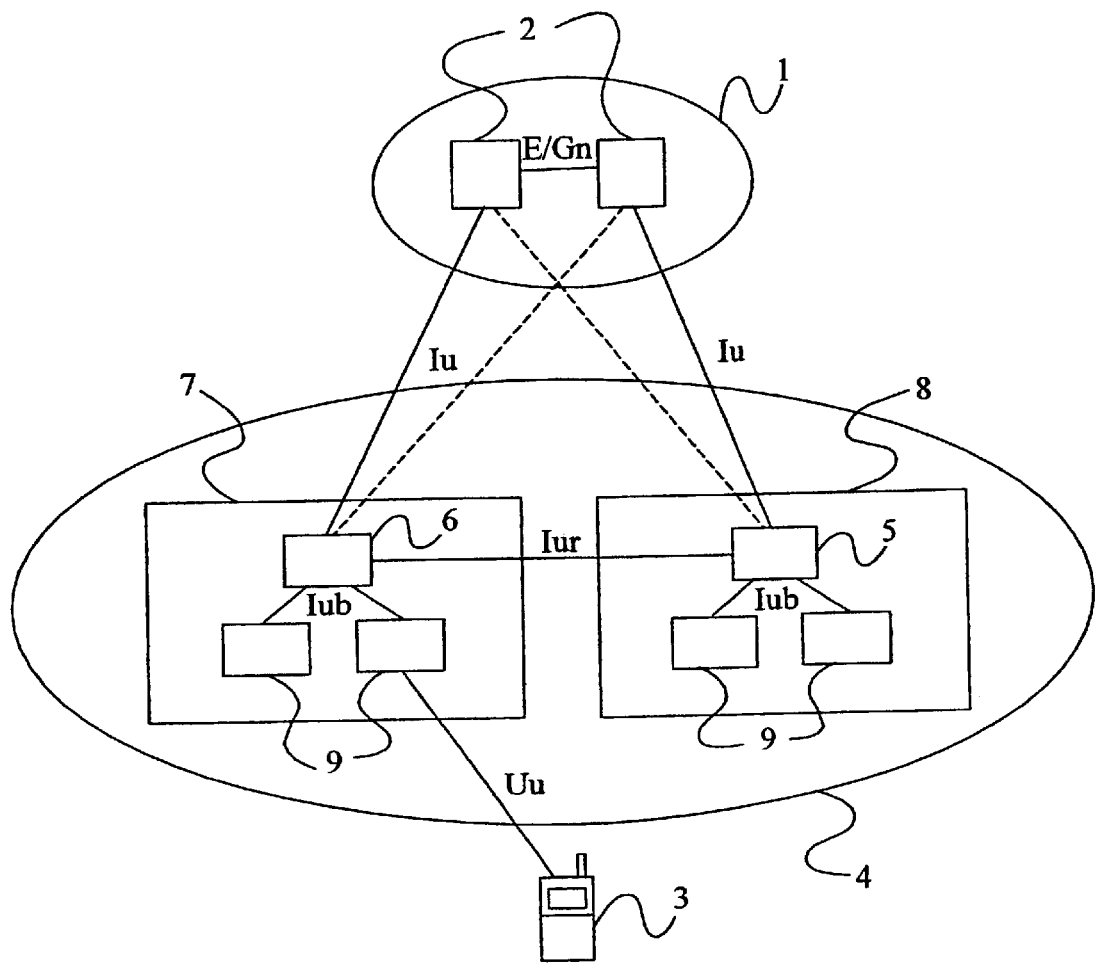
FIG. 1 illustrates schematically a UMTS network.
Figure 2:
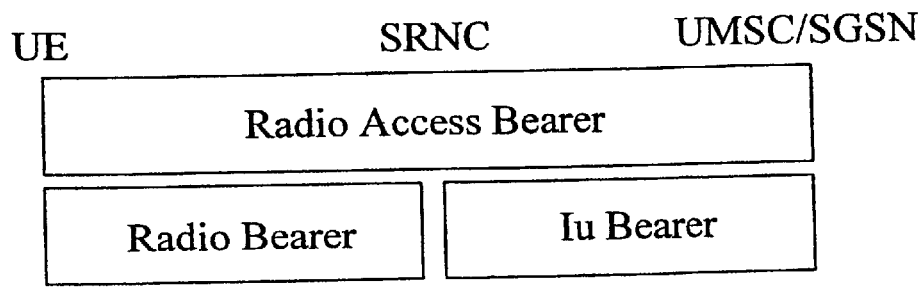
FIG. 2 illustrates schematically the bearer structure used in the UTRAN part of the UMTS network of FIG. 1.

A typical UMTS network has been described above with reference to FIG. 1, whilst the UTRAN bearer structure employed in such a network has been described with reference to FIG. 2. The Iu bearer illustrated in FIG. 2 terminates in the RNC and UMSC at so-called Iu User Plane protocol instances. Each of the Iu User Plane protocol instances communicate with upper layers of the same node, and in addition make use of a number of Iu UP functions.

Errors in the Iu User Plane (UP) can be classified as 'syntactical errors', 'semantical errors' or 'other errors'. A field in a message is defined to be syntactically incorrect if the field contains an unknown value defined as "reserved", or if its value part violates syntactic rules given in the specification of the value part. A message is defined to have semantically incorrect contents if it contains unexpected information which, possibly dependent on the state of the receiver, is in contradiction to the resources of the receiver and/or to the procedural part. Errors that are not seen as syntactical or semantical are defined as other errors. These errors include repeated failures of some procedures (e.g. Initialisation) and some error situations outside the Iu UP (e.g. initialisation failure at transcoder).

Figures 3, 4:
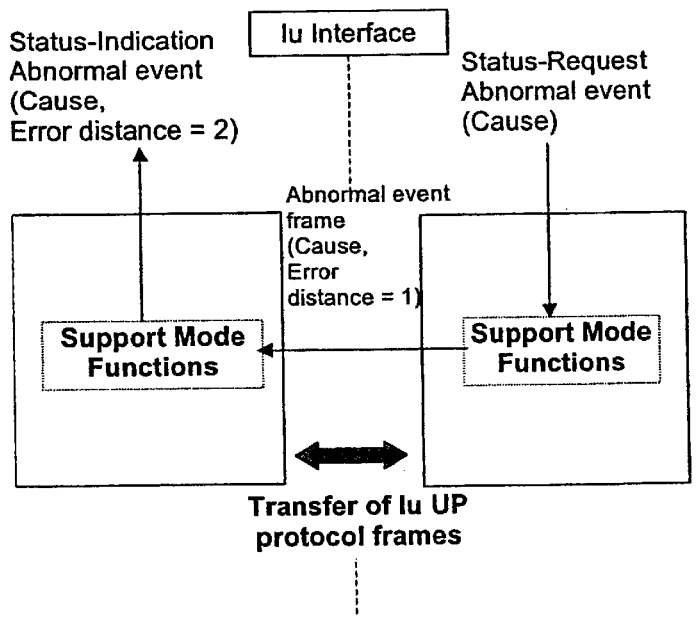
FIG. 3 illustrates an Abnormal Event Packet Data Unit used in the network of FIG. 1.
FIG. 4 illustrates a portion of the network of FIG. 1 in which an external error has arisen.

Error handling in the Iu User Plane (UP) is handled by an "abnormal event" procedure. This procedure makes use of an Iu UP frame which is sent over the Iu interface and which is referred to as an "abnormal event" frame. The abnormal event frame is illustrated in FIG. 3 and contains a 'Cause value' which identifies the type of the error. The abnormal event frame also contains a field termed 'Error distance' which identifies the distance (from the receiving entity) to the entity reporting the abnormal event. The 'Error distance' is 0 when the error is originally sent. When an Abnormal event report is relayed forward, the 'Error distance' is incremented by one. The Error distance comprises two bits, and the four possible values are defined as follows:

0—Reporting local error

1—First forwarding of abnormal event report

2—Second forwarding of abnormal event report

3—Reserved for future use.

An abnormal event procedure can be triggered at an RNC or UMSC by; an error detected by one of the Iu UP functions (e.g. received frame format unknown), a request made by upper layers (e.g. Initialisation failure in transcoder), or an abnormal event frame sent over the Iu UP.

When an error is detected within an Iu UP function, one of the following actions is taken depending on the type of the error: (1) the error is reported to the upper layers (e.g. upper layer report to operation and maintenance level); (2) an abnormal event frame is sent over the Iu UP; (3) an abnormal event frame is sent over the Iu UP and the error is reported to the upper layers; or (4) no action is taken.

Considering now a specific example, when an Iu-UP-Status-Request indicating an abnormal event is received at an Iu User Plane protocol instance (of an RNC or UMSC) from the upper layers, an abnormal event frame should be sent over the Iu interface indicating the appropriate error type. When the abnormal event frame is received over the Iu UP protocol at a peer Iu User Plane protocol instance, an Iu-Status-Indication indicating the abnormal event is sent from there to the upper layers.

FIG. 4 below shows this "external" error case where the abnormal event procedure is originally triggered by an Iu-UP-Status-Request. The abnormal event procedure acts on the received message by sending an abnormal event frame over the Iu interface. On the other side of the Iu interface, the reception of an abnormal event frame triggers an abnormal event procedure there, and an Iu-UP-Status-Indication is sent to the associated upper layers. The handling is symmetrical over the Iu UP protocol.

Figure 5:
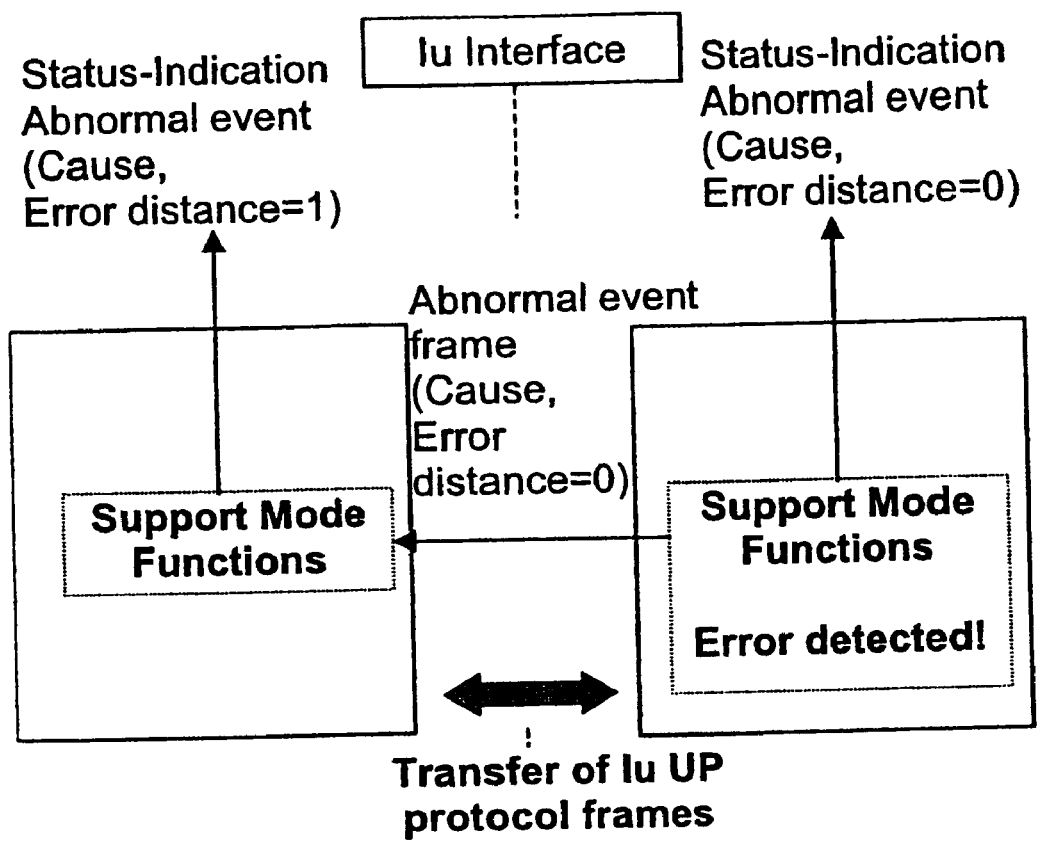
FIG. 5 illustrates a portion of the network of FIG. 1 in which an internal error has arisen.

FIG. 5 below shows an "internal" error case where the abnormal event procedure is originally triggered by an Iu UP function associated with an Iu User Plane protocol instance. The abnormal event procedure acts on this message by sending an abnormal event frame over the Iu interface. On the peer side of the interface, the reception of the abnormal event frame triggers a further abnormal event procedure, and an Iu-UP-Status-Indication is sent to the upper layers from the peer Iu User Plane protocol instance. Again, the handling is symmetrical over the Iu UP protocol.

It will be appreciated by the person of skill in the art that various modifications may be made to the above described embodiments without departing from the scope of the present invention. In particular, whilst the invention has been illustrated above with reference to an Iu interface between an RNC and a UMSC, this interface may exist between two RNCs, where the interface is carried transparently via the core network.

As an alternative to incorporating a distance counter into the abnormal event frame, a code may be incorporated which identifies the source of the error. For example, a code 0 may indicate that the error originating entity is an upper layer at a peer node (an application error), a code 1 may indicate that the error originating entity is an Iu UP protocol instance at a peer node (an Iu UP function error), and a code 2 may indicate that the error originating entity is an Iu UP protocol instance at the same node as the destination entity (again an Iu UP function error).

What is claimed is:

1. A method of reporting errors in a mobile telecommunications network having a core network and a UTMS Terrestrial Radio Access Network (UTRAN), the method comprising:

generating an error message at an error originating entity in one of the core network and the UTRAN;

sending the error message to an error destination entity in the other of the core network and the UTRAN over an Iu interface; and at each intermediate entity through which the error message passes, incrementing a distance counter contained in or accompanying the error message, wherein the error destination entity is able to identify the error originating entity on the basis of the value of the distance counter contained in or accompanying the received error message.

2. The method according to claim 1, wherein the error message is sent between a UMTS Mobile Switching Center (UMSC) of the core network and a Radio Network Controller (RNC) of the UTRAN.

3. The method according to claim 1, wherein the error message is sent between two RNCs via the core network.

4. The method according to claim 1, wherein the error message is generated at either an Iu User Plane protocol instance or at an upper layer entity of one of a UMSC and an RNC.

5. The method according to claim 1, wherein the error message is sent over the Iu interface to either an Iu User Plane protocol instance or an upper layer entity of the receiving one of a UMSC and an RNC.

6. The method according to claim 1, wherein the error message is generated by an upper layer entity and is sent to a peer entity, over the Iu interface, via respective Iu User Plane protocol instances at the sending and receiving one of a UMSC and an RNC.

7. The method according to claim 1, wherein the error message is generated by an Iu User Plane protocol instance and is sent to an upper layer entity of the same node, as well as over the Iu interface.

8. The method according to claim 1, wherein the error message is incorporated into an abnormal event frame for sending over the Iu interface.

9. The method according to claim 6, wherein the frame contains an error type identifier and the distance counter.

10. A mobile telecommunications network comprising a core network and a UMTS Terrestrial Radio Access Network (UTRAN) each comprising a number of nodes communicating over an Iu interface with nodes of the other network, wherein each node comprises:

means for generating error messages at an error originating entity;

means for sending error messages to an error destination entity in another node, and means for receiving error messages from an error generating entity in another entity, over an Iu interface; and at least one intermediate entity through which error messages pass and which are arranged to increment a distance counter contained in or accompanying each error message, wherein an error destination entity is able to identify the error originating entity on the basis of the value of the distance counter contained in or accompanying the received error message.

11. A method of reporting errors in a mobile telecommunications network having a core network and a UMTS Terrestrial Radio Access Network (UTRAN), the method comprising:

generating an error message at an error originating entity in one of the core network and the UTRAN;

constructing an abnormal event frame incorporating the error message and a code which identifies the location of the error originating entity; and sending the error message to an error destination entity in the other of the core network and the UTRAN over an Iu interface, wherein the error destination entity is able to identify the location of the error originating entity on the basis of the code contained in the abnormal event frame.

12. The method according to claim 11, wherein the method further comprises constructing a second or modified abnormal event frame incorporating the error message and a code which identifies the location of the error originating entity, wherein the code used to identify the location of the error originating entity is one of a first code which identifies the originating entity as belonging to a different node than the destination entity and a second code which identifies the originating entity as belonging to the same node as the destination entity.

* * * * *